(12) United States Patent
Goenka et al.

(10) Patent No.: US 8,839,632 B2
(45) Date of Patent: Sep. 23, 2014

(54) CONTROL STRATEGY FOR A ZONAL HEATING, VENTILATING, AND AIR CONDITIONING SYSTEM OF A VEHICLE

(75) Inventors: Lakhi Nandlal Goenka, Ann Arbor, MI (US); Clay Maranville, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 189 days.

(21) Appl. No.: 13/416,458

(22) Filed: Mar. 9, 2012

(65) Prior Publication Data

US 2013/0232996 A1 Sep. 12, 2013

(51) Int. Cl.
*F25B 21/02* (2006.01)

(52) U.S. Cl.
USPC .............................................. 62/3.61; 62/244

(58) Field of Classification Search
USPC ............ 62/3.3, 3.61, 238.7, 244; 165/59, 202
See application file for complete search history.

(56) References Cited

U.S. PATENT DOCUMENTS

| | | | |
|---|---|---|---|
| 5,172,856 A | 12/1992 | Tanaka et al. | |
| 5,878,809 A | 3/1999 | Heinle | |
| 6,079,485 A | 6/2000 | Esaki et al. | |
| 6,173,902 B1 | 1/2001 | Bauer et al. | |
| 6,202,934 B1 | 3/2001 | Kamiya et al. | |
| 6,389,826 B2 | 5/2002 | Buchholz et al. | |
| 6,390,380 B2 | 5/2002 | Ichishi et al. | |
| 6,439,468 B1 | 8/2002 | Lambert et al. | |
| 6,454,178 B1 * | 9/2002 | Fusco et al. | 236/49.3 |
| 6,679,075 B2 | 1/2004 | Kampf et al. | |
| 6,698,663 B2 | 3/2004 | Wang et al. | |
| 6,886,356 B2 | 5/2005 | Kubo et al. | |
| 6,949,021 B2 | 9/2005 | Ichisi et al. | |
| 7,275,379 B2 | 10/2007 | Zeng et al. | |
| 7,533,535 B2 | 5/2009 | Kadle et al. | |
| 7,610,767 B2 * | 11/2009 | Kadle et al. | 62/186 |
| 7,617,692 B2 * | 11/2009 | Dage et al. | 62/133 |
| 7,647,780 B2 * | 1/2010 | Aoki et al. | 62/3.61 |
| 7,813,840 B2 | 10/2010 | Suyama et al. | |
| 7,918,100 B2 | 4/2011 | Breed et al. | |
| 2008/0134715 A1 * | 6/2008 | Lewis et al. | 62/498 |
| 2008/0248736 A1 | 10/2008 | Aoki et al. | |
| 2009/0031741 A1 | 2/2009 | Hara et al. | |
| 2010/0140366 A1 | 6/2010 | Burns et al. | |
| 2010/0236770 A1 | 9/2010 | Pursifull | |
| 2010/0286830 A1 | 11/2010 | Wijaya et al. | |
| 2011/0082594 A1 | 4/2011 | Dage et al. | |
| 2011/0166711 A1 | 7/2011 | Markowitz et al. | |

FOREIGN PATENT DOCUMENTS

DE 102008037307 A1 3/2009

* cited by examiner

*Primary Examiner* — Melvin Jones
(74) *Attorney, Agent, or Firm* — Fraser Clemens Martin & Miller LLC; J. Douglas Miller

(57) ABSTRACT

A climate control system of a vehicle and a method of controlling the climate control system to minimize vehicle energy consumption and maximize occupant comfort. The climate control system includes a main HVAC system for conditioning a fluid discharged into a passenger compartment of the vehicle, an auxiliary HVAC system for conditioning a localized fluid of at least one HVAC zones of the passenger compartment, a seat system, and an HVAC controller. The HVAC controller controls the main HVAC system, the auxiliary HVAC system, and the seat system based upon at least one parameter and condition which pertains to at least one of electrical energy consumption of the vehicle and occupant comfort.

19 Claims, 7 Drawing Sheets

CONTROL STRATEGY FOR A ZONAL HEATING, VENTILATING, AND AIR CONDITIONING SYSTEM OF A VEHICLE

FIELD OF THE INVENTION

The present invention relates to a heating, ventilating, and air conditioning (HVAC) system of a vehicle, and more particularly to an HVAC system and a method of controlling the HVAC system to minimize vehicle energy consumption and maximize occupant comfort.

BACKGROUND OF THE INVENTION

A passenger compartment of a vehicle is typically heated and cooled by a heating, ventilating, and air conditioning (HVAC) system. The HVAC system directs a flow of air through a heat exchanger to heat or cool the air prior to flowing into the passenger compartment. In the heat exchanger, energy is transferred between the air and a coolant such as a water-glycol coolant, for example. The air is normally supplied from ambient air or a mixture of air re-circulated from the passenger compartment and the ambient air.

One of the objectives of the HVAC system is to make occupants within the passenger compartment comfortable. As such, the HVAC system typically includes one or more zones controlled by climate system settings (e.g. a temperature setting) established by the occupants. A control algorithm of the HVAC system determines adjustments to a temperature, a volume, and a rate of air flowing into each of the zones in accordance with the climate system settings established by the occupant located therein. A drawback of the control algorithm is that the climate system settings of prior occupants govern the HVAC system which may be counterproductive. For example, the settings of the prior occupants may require a heating of a respective zone when a cooling of the zone is desired. Further, if one of the zones is unoccupied, the climate system settings for the zone may affect the comfort of occupants in other zones.

Accordingly, it is important that the control algorithm of the HVAC system can also determine occupant comfort. Occupant comfort, however, is a complex reaction, involving physical, biological, and psychological responses to external conditions. Because of the complexity, the control algorithm of the HVAC system must consider variables that affect occupant comfort and a relationship between those variables and actual occupant comfort. Current HVAC systems employ multiple sensors and control actuators to measure and control the variables that affect occupant comfort. A typical HVAC system may include a temperature sensor measuring a temperature inside the passenger compartment, another temperature sensor measuring a temperature of the ambient air, and other additional sensors measuring sun heating load, humidity, etc. The control actuators of the HVAC system may include a variable speed blower, a means for varying the temperature and a direction of the air flow, as well as a means to control the mixture of air re-circulated from the passenger compartment and provided from the ambient air. The current HVAC systems, however, do not include algorithms that translate HVAC system measurements to occupant comfort. Further, current HVAC systems have a relatively large package size and consume a significant amount of energy. Recently, demand for reduced vehicle energy consumption, especially for hybrid and electric vehicles, has resulted in an effort to reduce energy requirements of the HVAC system.

Thus, there exists a need for a vehicle climate control system and a method of controlling the vehicle climate control system, which minimizes energy consumption, a package size, and a cost thereof, while maximizing occupant comfort.

SUMMARY OF THE INVENTION

In concordance and agreement with the present invention, a vehicle climate control system and a method of controlling the vehicle climate control system, which minimizes energy consumption, a package size, and a cost thereof, while maximizing occupant comfort, has surprisingly been discovered.

In one embodiment, a climate control system for a vehicle, comprises: a main heating, ventilating, and air conditioning system for conditioning a first fluid discharged into a passenger compartment of the vehicle, the passenger compartment having at least one heating, ventilating, and air conditioning zone; an auxiliary heating, ventilating, and air conditioning system for conditioning a localized fluid of the at least one heating, ventilating, and air conditioning zone of the passenger compartment; and a controller for controlling the main heating, ventilating, and air conditioning system and the auxiliary heating, ventilating, and air conditioning system based upon at least one of at least one parameter and at least one condition which pertains to at least one of electrical energy consumption of the vehicle and occupant comfort.

In another embodiment, a method of operating a vehicle climate control system comprises the steps of: providing a main heating, ventilating, and air conditioning system for conditioning a first fluid discharged into a passenger compartment of the vehicle, the passenger compartment having at least one heating, ventilating, and air conditioning zone; providing an auxiliary heating, ventilating, and air conditioning system for conditioning a localized fluid of the at least one heating, ventilating, and air conditioning zone of the passenger compartment; providing a controller for controlling the main heating, ventilating, and air conditioning system and the auxiliary heating, ventilating, and air conditioning system; measuring at least one of at least one parameter and at least one condition which pertains to at least one of electrical energy consumption of the vehicle and occupant comfort; determining an actual level of occupant comfort based upon at least one of the at least one measured parameter and the at least one measured condition; and controlling the main heating, ventilating, and air conditioning system and the auxiliary heating, ventilating, and air conditioning system based upon the actual level of occupant comfort while minimizing electrical energy consumption.

In another embodiment, a method of operating a vehicle climate control system comprises the steps of: providing a main heating, ventilating, and air conditioning system for conditioning a first fluid discharged into a passenger compartment of the vehicle, the passenger compartment having at least one heating, ventilating, and air conditioning zone; providing an auxiliary heating, ventilating, and air conditioning system for conditioning a localized fluid of the at least one heating, ventilating, and air conditioning zone of the passenger compartment; providing at least one seat system for conditioning a localized fluid of at least one seat disposed in the passenger compartment; providing a controller for controlling at least one of the main heating, ventilating, and air conditioning system, the auxiliary heating, ventilating, and air conditioning system, and the seat system; measuring at least one of at least one parameter and at least one condition which pertains to at least one of electrical energy consumption of the vehicle and occupant comfort; determining an actual level of occupant comfort based upon at least one of the at least one measured parameter and the at least one measured condition; determining an amount of work required by at least one of the main heating, ventilating, and air conditioning system, the auxiliary heating, ventilating, and air conditioning system, and the seat system to reach a desired level of occupant comfort from the actual level of occupant comfort; calculating a flow rate and a fluid discharge temperature for at least one of the main heating, ventilating, and air conditioning system, the auxiliary heating, ventilating, and air conditioning system, and the seat system based upon the amount of work required while minimizing the electrical energy consumption of the vehicle; and controlling the main heating, ventilating, and air conditioning system and the auxiliary heating, ventilating, and air conditioning system based upon the calculated flow rate and the calculated fluid discharge temperature for at least one of the main heating, ventilating, and air conditioning system, the auxiliary heating, ventilating, and air conditioning system, and the seat system.

DESCRIPTION OF THE DRAWINGS

The above, as well as other advantages of the present invention, will become readily apparent to those skilled in the art from the following detailed description, when considered in the light of the accompanying drawings.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
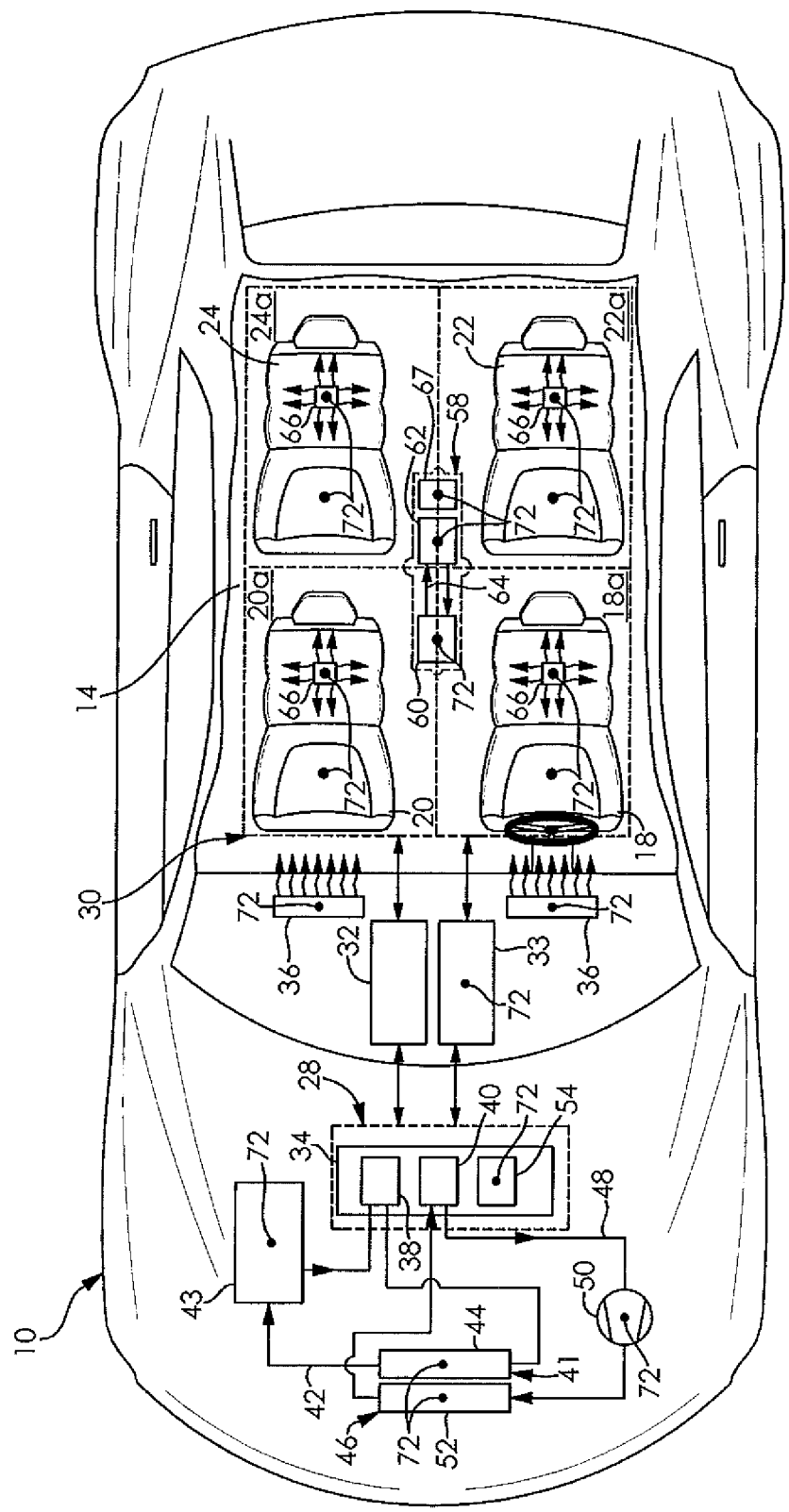
FIG. 1 is a schematic top plan view of a vehicle including a climate control system according to an embodiment of the present invention, wherein the climate control system includes a main HVAC system and an auxiliary HVAC system having a single thermoelectric module which conditions a localized fluid of four HVAC zones defined within the vehicle.
Figure 2:
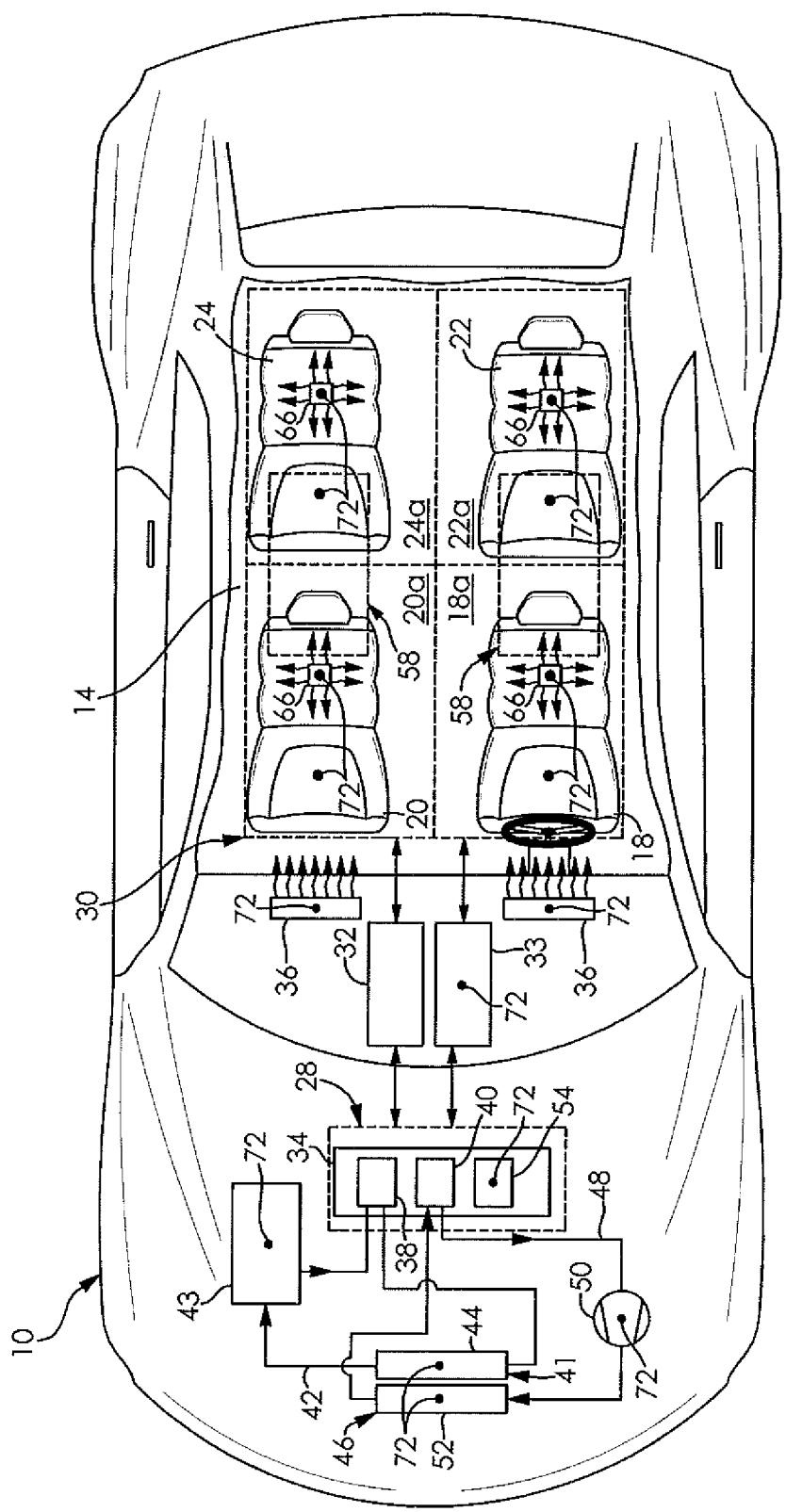
FIG. 2 is a schematic top plan view of a vehicle including a climate control system according to another embodiment of the present invention, wherein the climate control system includes a main HVAC system and an auxiliary HVAC system having a pair of thermoelectric modules, each of which conditions a localized fluid of two HVAC zones defined within the vehicle.
Figure 3:
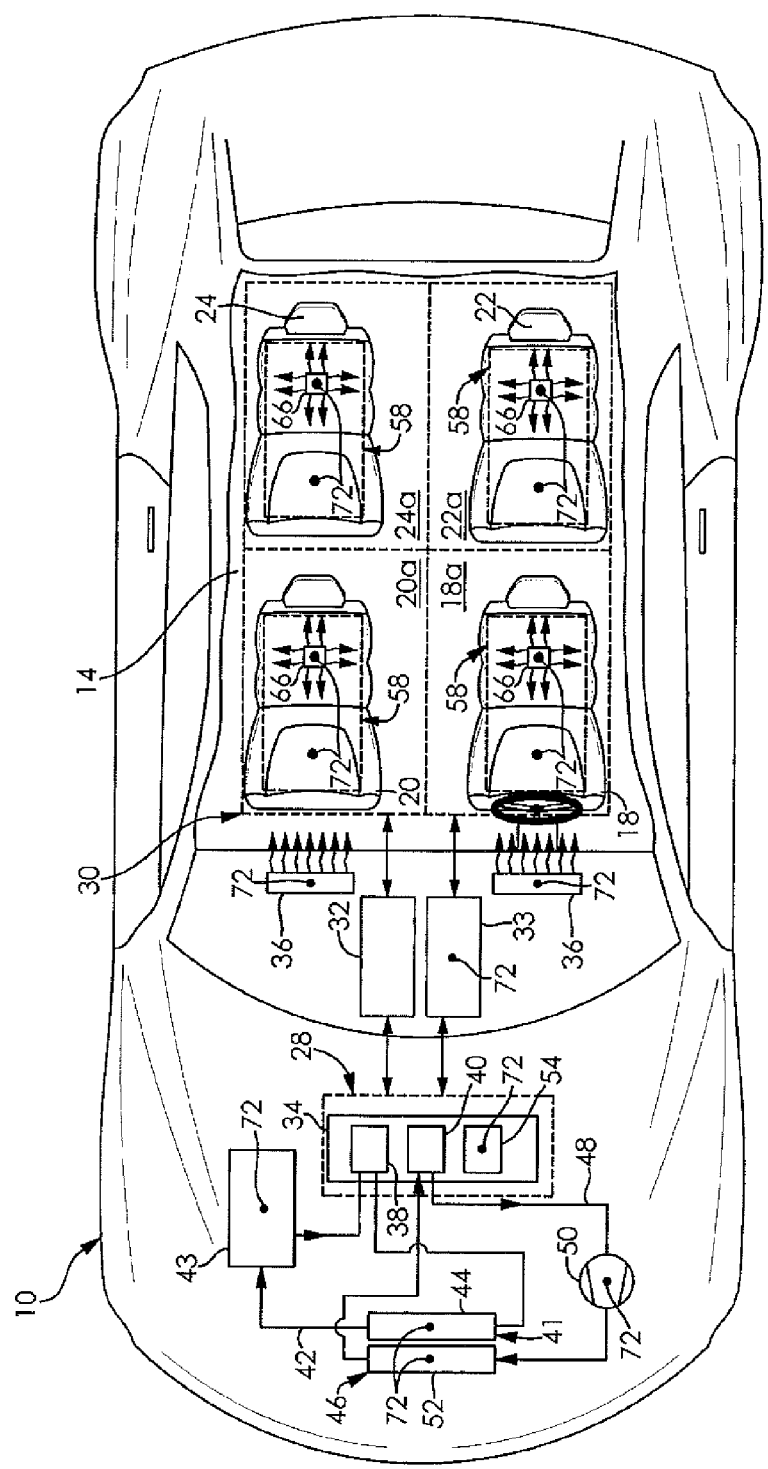
FIG. 3 is a schematic top plan view of a vehicle including a climate control system according to another embodiment of the present invention, wherein the climate control system includes a main HVAC system and an auxiliary HVAC system having four thermoelectric modules, each of which conditions a localized fluid of a single HVAC zone defined within the vehicle.

FIGS. 1-3 schematically show a vehicle 10 including a passenger compartment 14 having a driver side front seat 18, a passenger side front seat 20, a driver side rear seat 22, and a passenger side rear seat 24. Although the vehicle 10 shown has a four-passenger capacity, it is understood that the present invention can be employed in vehicles of other capacities such as two-passenger or eight-passenger vehicles, for example. In the illustrated embodiment, the passenger compartment 14 is divided into heating, ventilating, and air conditioning (HVAC) zones 18a, 20a, 22a, 24a, each of which includes an area encompassing the respective seats 18, 20, 22, 24. It is contemplated in the present invention, however, that any area, or combination of areas, within the passenger compartment 14 can be an HVAC zone. For example, an area encompassing both the driver side front seat 18 and the passenger side front seat 20 can define a front passenger HVAC zone, and an area encompassing both the driver side rear seat 22 and the passenger side rear seat 24 can define a rear passenger HVAC zone.

The vehicle 10 is equipped with a climate control system including a main HVAC system 28, an auxiliary HVAC system 30, and an HVAC controller 32 for controlling the main HVAC system 28 and the auxiliary HVAC system 30. It is also contemplated that the climate control system further includes at least one seat system (not shown) disposed within the passenger compartment 14. In certain embodiments, the seat system includes a thermoelectric device for conditioning a fluid therein, a fluid pump for causing a flow of the fluid through the seat system, a variable speed blower, and a heat exchanger for either transferring a heat to or from a localized fluid of at least one of the seats 18, 20, 22, 24. A power source 33 (e.g. a battery) is disposed in the vehicle 10 to provide power to the main HVAC system 28, the auxiliary HVAC system 30, the HVAC controller 32, the seat system, and any other component or vehicle system which requires electrical energy to operate. Other means of providing power can be employed as desired.

The main HVAC system 28 includes a conditioning module 34 having a housing (not shown) provided with an arrangement of ducts (e.g. defrost, driver side front face and/or foot, passenger side front face and/or foot, driver side rear foot, passenger side rear foot, and the like), selectively positionable doors (not shown), and actuators (not shown) for positioning the doors. The ducts, the doors, and the actuators are employed to vary a direction of a flow of a first fluid (e.g. air) through the conditioning module 34 and control a mixture of ambient air and the first fluid re-circulated from the passenger compartment 14. In certain embodiments, the ducts of the conditioning module 34 are in fluid communication with fluid vents 36 located within the passenger compartment 14. It is understood that the fluid vents 36 can be any size and shape and positioned at any suitable location within the passenger compartment 14 to optimize an efficiency of the main HVAC system 28 and occupant comfort.

A heating element 38 (e.g. a heater core) and a cooling element 40 (e.g. an evaporator core) are also disposed in the housing of conditioning module 34. The heating and cooling elements 38, 40 are employed to vary a temperature of the flow of the first fluid through the control module 34 and into the passenger compartment 14. In the illustrated embodiment, the heating element 38 is in fluid communication with a fluid conditioning system 41 via a conduit 42. The fluid conditioning system 41 supplies a heated second fluid (e.g. an engine coolant, water, air, etc.) to the heating element 38 for increasing a temperature of the first fluid flowing through the control module 34. In a non-limiting example, the fluid conditioning system 41 is a cooling system for a vehicle power source 43 (e.g. a vehicle engine and/or a battery pack, etc.). The fluid conditioning system 41 shown includes the vehicle power source 43 for supplying the heated second fluid to the heating element 38 and a radiator 44 for cooling the second fluid from the heating element 38 and supplying the cooled second fluid to the vehicle power source 43. It is understood that the fluid conditioning system 41 can include other components (not shown) necessary for operation (e.g. valves, fluid reservoirs, etc.).

As shown, the cooling element 40 is in fluid communication with a second fluid conditioning system 46 via a conduit 48. The fluid conditioning system 46 supplies a cooled third fluid (e.g. a refrigerant, etc.) to the cooling element 40 for decreasing a temperature of the first fluid flowing through the control module 34. In a non-limiting example, the fluid conditioning system 46 is an air conditioning system. The fluid conditioning system 46 shown includes a compressor 50 for compressing the third fluid from the cooling element 40 and a condenser 52 for cooling the compressed third fluid and supplying the cooled third fluid to the cooling element 40. It is understood that the fluid conditioning system 46 can include other components (not shown) necessary for operation (e.g. valves, an orifice tube, a dryer, an accumulator, expansion device, etc.). Other means for heating and cooling the flow of fluid through the control module 34 can be employed if desired. The conditioning module 34 shown also includes a variable speed blower 54 for causing the fluid to flow into and through the heating and cooling elements 38, 40, through the ducts 36, and from the control module 34 into the passenger compartment 14.

In certain embodiments of the invention, the auxiliary HVAC system 30 is a multi-zonal HVAC system used to condition a localized fluid of multiple HVAC zones. In a non-limiting example shown in FIG. 1, the auxiliary HVAC system 30 includes a single thermoelectric module 58 centrally located within either a headliner area or a floor area of the passenger compartment 14 used to discharge the conditioned fluid into the HVAC zones 18a, 20a, 22a, 24a. In another non-limiting example shown in FIG. 2, the auxiliary HVAC system 30 includes a pair of thermoelectric modules 58. One of the thermoelectric modules 58 is located between the driver side front seat 18 and the driver side rear seat 22 within either the headliner area or the floor area of the passenger compartment 14. The other one of the thermoelectric modules 58 is located between the passenger side front seat 20 and the passenger side rear seat 24 within either the headliner area or the floor area of the passenger compartment 14. In yet another non-limiting example shown in FIG. 3, the auxiliary HVAC system 30 includes a plurality of thermoelectric modules 58, each of which is disposed in a respective one of the HVAC zones 18a, 20a, 22a, 24a. Although the thermoelectric modules 58 shown are located within the headliner area or the floor area of the passenger compartment 14, it is understood that the thermoelectric modules 58 can be placed in any suitable location within the vehicle 10. It is also understood that additional or fewer thermoelectric modules 58 than shown can be employed if desired. Other means for heating and cooling the flow of the localized fluid through the auxiliary HVAC system 30 can be employed if desired.

Each of the thermoelectric modules 58 includes a thermoelectric device 60 in fluid communication with a heat exchanger 62. For simplicity, the various components of the thermoelectric module 58 are shown only in FIG. 1. However, it is understood that the thermoelectric modules 58 of FIGS. 2 and 3 include the same components as shown in FIG. 1. As shown in FIG. 1, the thermoelectric device 60 can be separately formed from the heat exchanger 62 and fluidly connected via a conduit 64. The present invention, however, also contemplates that the thermoelectric device 60 can be integrally formed with the heat exchanger 62 into a single unit as is commonly understood in the art. The thermoelectric device 60 is employed to vary a temperature of a flow of a fourth fluid (e.g. a coolant, water, an alcohol, etc.) within the thermoelectric module 58. The fourth fluid circulates within each of the thermoelectric modules 58 to transfer heat either from or to the localized fluid being conditioned by the auxiliary HVAC system 30.

As illustrated, the thermoelectric device 60 is electrically connected to the power source 33 to provide electrical energy thereto. If the electrical energy is provided in one polarity, the thermoelectric device 60 is caused to heat the fourth fluid circulating therethrough. Alternatively, if the electrical energy is provided in an opposite polarity, the thermoelectric device 60 is caused to cool the fourth fluid. Accordingly, a reverse of polarity causes the thermoelectric device 60 to change between a cooling mode and a heating mode.

In certain embodiments of the invention, each of the thermoelectric modules 58 is provided with an arrangement of ducts (not shown), selectively positionable doors (not shown), and actuators (not shown) for positioning the doors. The ducts, the doors, and the actuators are employed to vary a direction of a flow of the localized fluid through the thermoelectric module 58. In certain embodiments, the ducts of the thermoelectric module 58 are in fluid communication with fluid vents 66 located within the passenger compartment 14. It is understood that the fluid vents 66 can be any size and shape and positioned at any suitable location within the passenger compartment 14 to optimize an efficiency of the auxiliary HVAC system 30 and occupant comfort. In other embodiments of the invention, multiple thermoelectric modules 58 can utilize the same ducts, doors, actuators, and fluid vents 66 to control the flow of the localized fluid therethrough, minimizing a complexity, a package space, and a cost of the auxiliary HVAC system 30. In yet other embodiments, each of the thermoelectric modules 58 can utilize the ducts, the doors, the actuators, and the fluid vents 36 of the main HVAC system 28 if desired to further minimize the complexity, the package space, and the cost of the auxiliary HVAC system 30. The thermoelectric module 58 shown also includes a variable speed blower 67 for causing the fluid to flow into and through the heat exchanger 62, through the ducts, and from the thermoelectric module 58 into the associated HVAC zone 18a, 20a, 22a, 24a of the passenger compartment 14.

Figure 4:
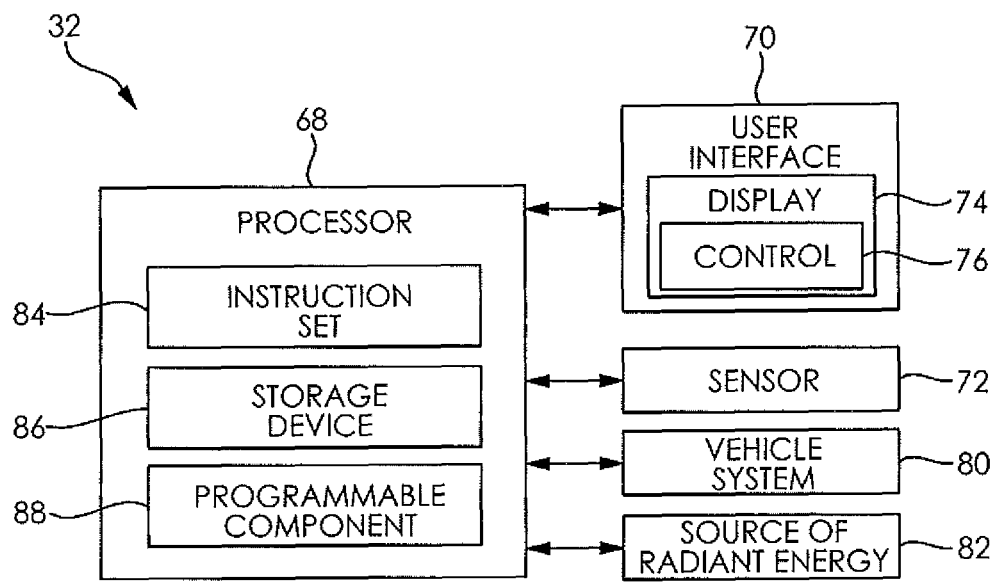
FIG. 4 is a schematic diagram of an HVAC controller of the climate control system illustrated in FIGS. 1-3.

FIG. 4 illustrates the HVAC controller 32 according to an embodiment of the present invention. The HVAC controller 32 includes a processor 68 in electrical communication with at least one user interface 70 and a plurality of sensors 72. It is understood that the HVAC controller 32 can be in communication with as many user interfaces 70 and sensors 72 as desired. As shown, the user interface 70 includes a display 74 for generating a visible output to the user. The display 74 can be any type of display such as a two dimensional display, a three dimensional display, a touch screen, and the like, as employed in a heads-up display or a center stack display, for example. It is understood, however, that the display 74 can be disposed in various locations throughout the vehicle 10 such as a headrest, an overhead module, and the like, for example. As a non-limiting example, the visual output generated by the display 74 is a menu system including a plurality of controls 76 associated with a vehicle system 80 such as the climate control system, for example. However, any vehicle system 80 can be associated with the controls 76. In addition, each of the controls 76 generates and transmits to the HVAC controller 32 an input signal representative of a desired setting (e.g. temperature, blower speed, etc.) of the vehicle system 80 that is controlled manually by the driver.

As shown in FIGS. 1-3, the sensors 72 are located at various locations in the vehicle 10. Each of the sensors 72 is a device capable of detecting and measuring parameters and conditions which pertain to electrical energy consumption of the vehicle 10 and occupant comfort. In certain embodiments, the sensors 72 generate and transmit signals (i.e. sensor signals) which are representative of environmental parameters and conditions (e.g. an ambient air temperature, a sun load/heat flux, an average temperature of each of the HVAC zones, an average passenger compartment interior temperature, an ambient air humidity, a passenger compartment humidity, a temperature stratification of each of the HVAC zones, a seat surface temperature, a passenger compartment interior temperature adjacent a vehicle occupant, a passenger compartment humidity adjacent a vehicle occupant, etc.), vehicle occupant parameters and conditions (e.g. number of vehicle occupants, an HVAC zone position of the vehicle occupants, a skin temperature, a clothing temperature, a body heat flux, other biometrics, etc.), electrical energy parameters and conditions (e.g. an auxiliary HVAC system power, a thermoelectric module power, a seat system power, a compressor power, compressor revolutions per minute, a blower power, a blower speed, an engine fan power, an engine fan speed, an electric heater power, an auxiliary fluid pump power, etc.), and vehicle parameters and conditions (e.g. a main HVAC system discharge air temperature, an auxiliary HVAC system discharge air temperature, a main HVAC system flow rate, an auxiliary HVAC system flow rate, main HVAC system blend door positions, an engine coolant temperature, a battery temperature, a thermoelectric device coolant temperature, engine revolutions per minute, an alternator loading, an engine mechanical loading, a battery power consumption, a battery charge, a rate of change of battery charge, etc.) The signals from the sensors 72 are provided to the processor 68 of the HVAC controller 32 as input signals.

The sensors 72 can be relatively low cost devices which utilize relatively simple algorithms for detecting the parameters and conditions. In certain embodiments, at least one of the sensors 72 is a temperature sensor for capturing a temperature measurement and generating a sensor signal representing the captured measurement. Suitable temperature sensors include, but are not limited to, a thermocouple, a thermistor (e.g. a negative temperature coefficient (NTC) sensor, a positive temperature coefficient (PTC) sensor, etc.), and a resistance temperature detector (RTD).

In other embodiments, at least one of the sensors 72 is a humidity sensor for capturing a humidity measurement and generating a sensor signal representing the captured measurement. The humidity sensors can be any suitable humidity sensor as desired such as a capacitive humidity sensor, a resistive humidity sensor, and a thermal conductivity humidity sensor, for example.

In yet other embodiments, at least one of the sensors 72 is a camera for capturing a plurality of time-sequenced temperatures and images of the vehicle occupant. For example, the captured temperatures can be associated with skin and clothing of the vehicle occupant (e.g. the skin temperature of sensitive regions of a body of the vehicle occupant such as a head and a neck for warm regions and feet, hands, and a neck for cold regions, the clothing temperature adjacent the sensitive regions of the body of the vehicle occupant, etc.). The captured images can be used to determine a type of clothing worn by the vehicle occupant and regions of exposed skin of the vehicle occupant, for example. It is understood that any suitable camera and image capturing device can be used such as an active-pixel digital image camera, an optical image camera, or a thermal image camera, for example. It is further understood that other sensors (i.e. independent or paired with a camera sensor) can be used such as an infrared sensor, for example.

In certain embodiments, at least one source of radiant energy 82 is disposed to illuminate the vehicle occupant. As a non-limiting example, the source of radiant energy 78 may be an infrared light emitting diode. However, other sources of the radiant energy can be used.

The processor 68 of the HVAC controller 32 may be any device or system adapted to receive the input signals (e.g. the sensor signals), analyze the input signals, and control the main HVAC system 28, the auxiliary HVAC system 30, and the seat system in response to the analysis of the input signals. In certain embodiments, the processor 68 is a micro-computer. In the embodiment shown, the processor 68 receives the input signals from at least one of the sensors 72 and at least one of the controls 76.

As shown, the processor 68 analyzes the input signals based upon an instruction set 84. The instruction set 84, which may be embodied within any computer readable medium, includes processor executable instructions for configuring the processor 68 to perform a variety of tasks. The processor 68 may execute a variety of functions such as controlling the operation of the sensors 72, the main HVAC system 28, the auxiliary HVAC system 30, the fluid conditioning systems 41, 46, the seat system, and other vehicle components and systems (e.g. a navigation system, a fuel system, an entertainment system, a steering system, etc.), for example.

In certain embodiments, various algorithms and software can be used to analyze the input signals to minimize the electrical energy consumption of the vehicle 10 and optimize occupant comfort. As a non-limiting example, the instruction set 84 is a learning algorithm adapted to optimize the electrical energy consumption of the vehicle 10 and occupant comfort based upon the information received by the processor 68 (e.g. via the sensor signals). The instruction set 84 is further adapted to control at least one of the operation of the sensors 72, the main HVAC system 28, the auxiliary HVAC system 30, the fluid conditioning systems 41, 46, and the seat system.

In certain embodiments, the processor 68 includes a storage device 86. The storage device 86 may be a single storage device or may be multiple storage devices. Furthermore, the storage device 86 may be a solid state storage system, a magnetic storage system, an optical storage system, or any other suitable storage system or device. It is understood that the storage device 86 may be adapted to store the instruction set 84. Other data and information may be stored and cataloged in the storage device 86 such as the data collected by the sensors 72, the user interface 70, and the like, for example.

The processor 68 may further include a programmable component 88. It is understood that the programmable component 88 may be in communication with any other component of the HVAC controller 32 such as the sensors 72 and the user interface 70, for example. In certain embodiments, the programmable component 88 is adapted to manage and control processing functions of the processor 68. Specifically, the programmable component 88 is adapted to modify the instruction set 84 and control the analysis of the input signals and the information received by the processor 68. It is understood that the programmable component 88 may be adapted to manage and control the sensors 72, the user interface 70, the main HVAC system 28, the auxiliary HVAC system 30, and the seat system. It is further understood that the programmable component 88 may be adapted to store data and information on the storage device 86, and retrieve data and information from the storage device 86.

The climate control strategy of the present invention is based on the determination of HVAC Work relating to a thermal comfort of the vehicle occupant and electrical energy consumption of the vehicle 10. An output of the HVAC systems 30, 32 and the seat system is referred to as HVAC work.

Figure 5:
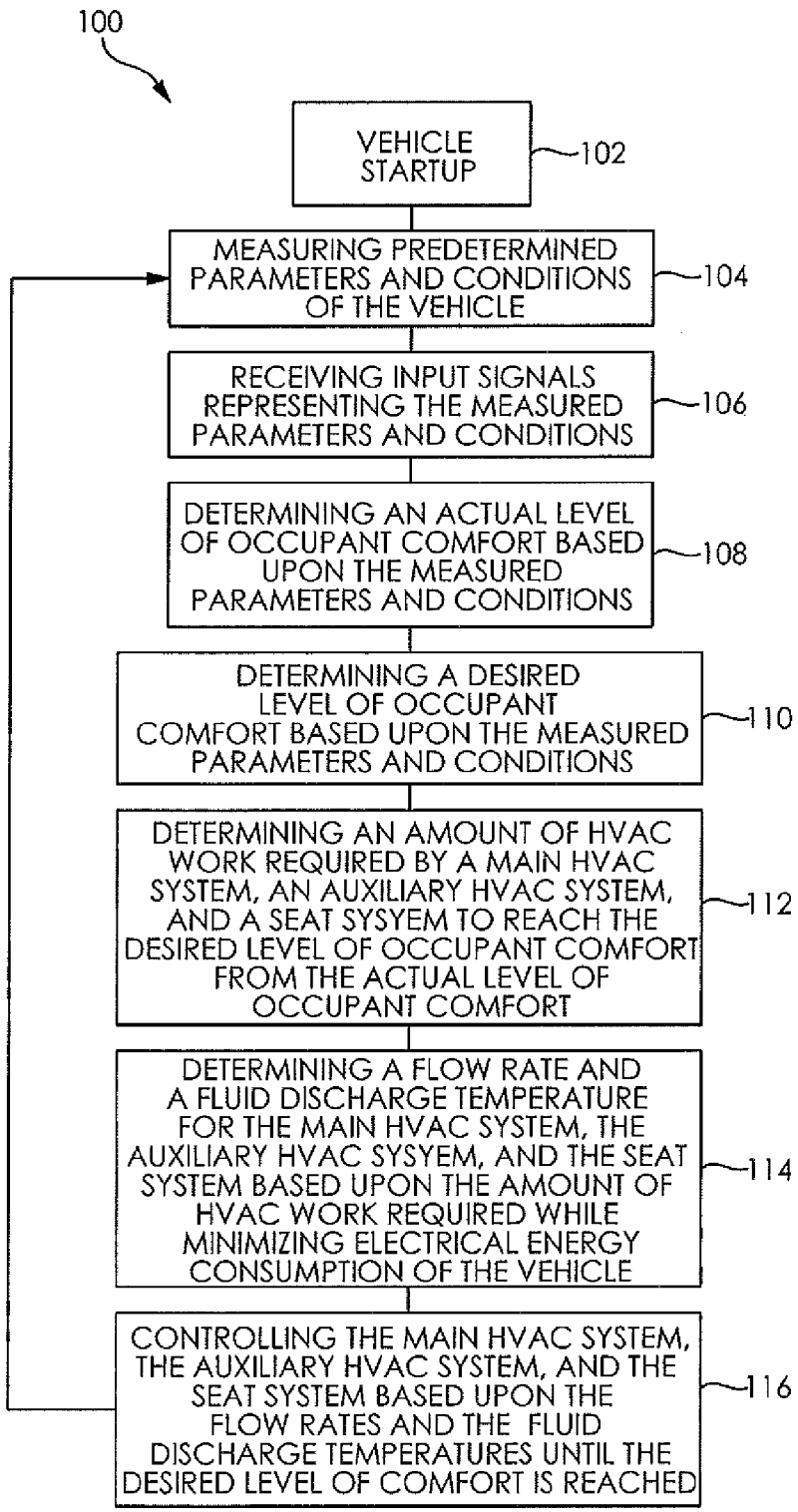
FIG. 5 is a schematic flow diagram of a method of operation of the climate control system illustrated in FIGS. 1-3 according to an embodiment of the present invention.

Turning now to FIG. 5, there is shown a flow diagram illustrating the general sequence of steps associated with a method 100 of the present invention. Although steps shown in FIG. 5 are depicted sequentially, it is understood that the steps can be implemented in any manner as desired.

In step 102, a startup of the vehicle 10 occurs. In step 104, the sensors 72 detect and measure the predetermined parameters and conditions of the vehicle 10 and occupants (e.g. the environmental, vehicle occupant, electrical energy, and vehicle parameters and conditions described hereinabove). In certain embodiments, each of the sensors 72 cooperates with the processor 68 to provide a quantitative value representing each of the measured parameters and conditions. In step 106, the processor 68 of the HVAC controller 32 receives an input signal from each of the sensors 72 and in step 108 determines an actual level of occupant comfort or target temperature ($T_{ACTUAL}$) based upon the measured parameters and conditions. As a non-limiting example, the processor 68 employs the use of the instruction set 84 to determine the actual level of occupant comfort ($T_{ACTUAL}$). As a further non-limiting example, the processor 68 determines the actual level of occupant comfort ($T_{ACTUAL}$) using a lookup table, comfort charts, the American Society of Heating, Refrigerating and Air-Conditioning Engineers (ASHRAE) thermal sensation scale, the ASHRAE Standard 55, the International Standards Organization (ISO) Standard 7730, the predicted mean vote index, the predicted percentage dissatisfied index, the lowest possible percentage dissatisfied index, the Fanger comfort equation, and the like, or any combination thereof. It is understood that the actual level of occupant comfort ($T_{ACTUAL}$) may account for temperature stratification where hot air accumulates in a pocket near a roof of the vehicle 10, which can be undesirable to the vehicle occupants.

In step 110, the processor 68 of the HVAC controller 32 determines a desired level of occupant comfort or target temperature ($T_{TARGET}$) based upon the measured parameters and conditions. As a non-limiting example, the processor 68 employs the use of the instruction set 84 to determine the desired level of occupant comfort ($T_{TARGET}$). As a further non-limiting example, the processor 68 determines the desired level of occupant comfort ($T_{TARGET}$) using a lookup table, comfort charts, the ASHRAE thermal sensation scale, the ASHRAE Standard 55, the ISO Standard 7730, the predicted mean vote index, the predicted percentage dissatisfied index, the lowest possible percentage dissatisfied index, the Fanger comfort equation, and the like, or any combination thereof. It is understood that the desired level of occupant comfort ($T_{TARGET}$) can be pre-set at any suitable level as desired.

In step 112, the processor 68 of the HVAC controller 32 determines an amount of HVAC work required by each of the main HVAC system 28, the auxiliary HVAC system 30, and the seat system to reach the desired level of occupant comfort ($T_{TARGET}$) from the actual level of occupant comfort ($T_{ACTUAL}$). As a non-limiting example, the processor 68 employs the use of the instruction set 84 to determine the amount of HVAC work required by each of the main HVAC system 28, the auxiliary HVAC system 30, and the seat system to reach the desired level of occupant comfort ($T_{TARGET}$) from the actual level of occupant comfort ($T_{ACTUAL}$).

In step 114, the processor 68 determines the flow rate and the fluid discharge temperature required for each of the main HVAC system 28, the auxiliary HVAC system 30, and the seat system based upon the HVAC work required to reach the desired level of occupant comfort ($T_{TARGET}$) while minimizing electrical energy consumption of the vehicle 10. As a non-limiting example, the processor 68 employs the use of the instruction set 84 to determine the flow rate and the fluid discharge temperature required for each of the main HVAC system 28, the auxiliary HVAC system 30, and the seat system based upon the HVAC work required to reach the desired level of occupant comfort ($T_{TARGET}$) while minimizing the electrical energy consumption of the vehicle 10.

In step 116, the processor 68 controls the each of the main HVAC system 28, the auxiliary HVAC system 30, and the seat system based upon the flow rates and the fluid discharge temperatures required until the desired level of occupant comfort ($T_{TARGET}$) is reached. For example, the processor 68 controls a speed of the blower 54 of the HVAC conditioning module 34 of the main HVAC system 28 by varying the power supplied thereto, a speed of the blower 67 of each of the thermoelectric modules 58 of the auxiliary HVAC system 30 by varying the power supplied thereto, a speed of the blower of the seat system by varying the power supplied thereto, a position of at least one of the doors (e.g. temperature doors, volume doors, mode doors, etc.) of the HVAC conditioning module 34, and a position of at least one of the doors (e.g. temperature doors, volume doors, mode doors, etc.) of the thermoelectric module 58. Other components and systems of the vehicle 10 can be controlled by the processor 68 to reach the desired level of occupant comfort ($T_{TARGET}$).

It is understood that the steps for the method 100 as described hereinabove can be repeated as desired.

Figure 6:
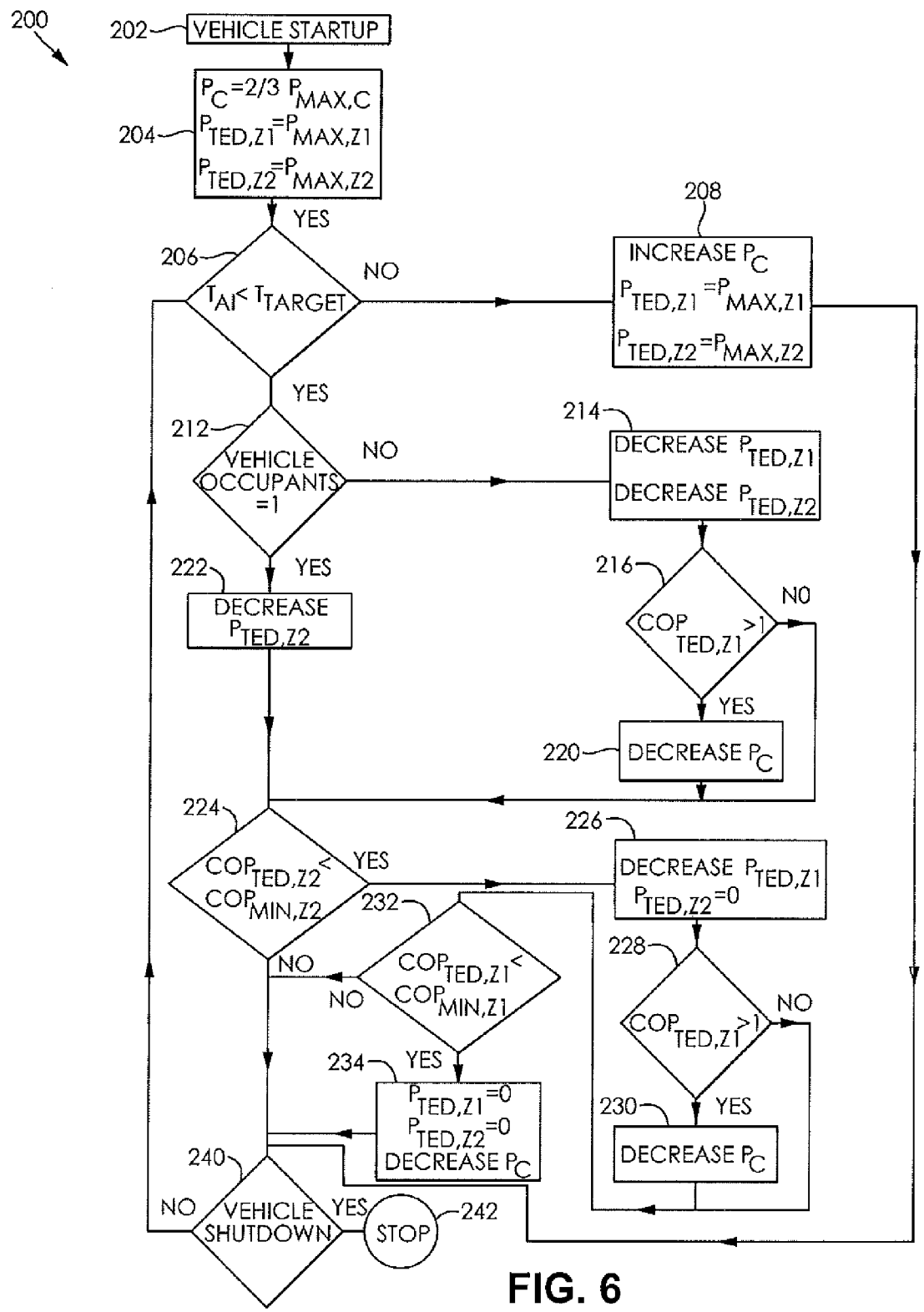
FIG. 6 is a schematic flow diagram of a method of operation of the climate control system illustrated in FIGS. 1-3 during hot ambient temperatures.

As a non-limiting example of the climate control strategy of the present invention, a method 200 is illustrated in FIG. 6. In the illustrated example, the main HVAC system 28 includes the compressor 50 and the auxiliary HVAC system 30 includes a first thermoelectric module 58 for a driver side HVAC zone (TED, Z1) and a second thermoelectric module 58 for a passenger side HVAC zone (TED, Z2). A first step 202 of the method 200 is a startup of the vehicle 10 during which the climate control strategy is enabled. In the example of FIG. 6, the climate control strategy is for operation during relatively hot ambient temperatures (i.e. a cooling mode).

In step 204, a power ($P_C$) supplied to the compressor 50 of the main HVAC system 28, a power ($P_{TED, Z1}$) supplied to the first thermoelectric module 58, and a power ($P_{TED, Z2}$) supplied to the second thermoelectric module 58 are set at predetermined levels by the processor 68. In the illustrated example, the power ($P_C$) supplied to the compressor 50 is set at two-thirds (⅔) of maximum power ($P_{MAX, C}$), the power ($P_{TED, Z1}$) supplied to the first thermoelectric module 58 is set at maximum power ($P_{MAX, Z1}$), and the power ($P_{TED, Z2}$) supplied to the second thermoelectric module 58 is set at maximum power ($P_{MAX, Z2}$). It is understood that the power ($P_C$) supplied to the compressor 50, the power ($P_{TED, Z1}$) supplied to the first thermoelectric module 58, and the power ($P_{TED, Z2}$) supplied to the second thermoelectric module 58 can be set at any predetermined level as desired. It is also understood that the maximum power ($P_{MAX, C}$) supplied to the compressor 50, the maximum power ($P_{MAX, Z1}$) supplied to the first thermoelectric module 58, and the maximum power ($P_{MAX, Z2}$) supplied to the second thermoelectric module 58 can be any suitable amount of power as desired.

In step 206, the processor 68 compares a passenger compartment interior temperature ($T_{AI}$) measured by one of the sensors 72 to a desired level of occupant comfort ($T_{TARGET}$)

determined by the processor 68 based upon the predetermined parameters and conditions measured by at least one of the sensors 72. If the passenger compartment interior temperature ($T_{AI}$) is not less than the desired level of occupant comfort ($T_{TARGET}$), the processor 68 proceeds to step 208. In step 208, the processor 68 increases the power ($P_C$) supplied to the compressor 50, and maintains the power ($P_{TED, Z1}$) supplied to the first thermoelectric module 58 and the power ($P_{TED, Z2}$) supplied to the second thermoelectric module 58 at maximum power ($P_{MAX, Z1}$), ($P_{MAX, Z2}$), respectively. The processor 68 then proceeds to step 240.

Alternatively, when the passenger compartment interior temperature ($T_{AI}$) is less than the desired level of occupant comfort ($T_{TARGET}$), the processor 68 proceeds to step 212. In step 212, the processor 68 determines whether the number of vehicle occupants is equal to 1. It is understood that the number of vehicle occupants can be determined based upon the predetermined parameters and conditions measured by at least one of the sensors 72. If the number of occupants is not equal to 1, the processor 68 proceeds to step 214. In step 214, the processor 68 maintains the power ($P_C$) supplied to the compressor 50 at two-thirds (⅔) of maximum power ($P_{MAX, C}$), and decreases both the power ($P_{TED, Z1}$) supplied to the first thermoelectric module 58 and the power ($P_{TED, Z2}$) supplied to the second thermoelectric module 58. The processor 68, then in step 216, determines whether a coefficient of performance ($COP_{TED, Z1}$) of the first thermoelectric module 58 is greater than 1. If the coefficient of performance ($COP_{TED, Z1}$) of the first thermoelectric module 58 is not greater than 1, the processor 68 proceeds to step 224. On the other hand, if the coefficient of performance ($COP_{TED, Z1}$) of the first thermoelectric module 58 is greater than 1, the processor 68, in step 220, decreases the power ($P_C$) supplied to the compressor 50 prior to proceeding to step 224.

Alternatively, when the number of vehicle occupants is determined to equal 1 in step 212, the processor 68 proceeds to step 222. In step 222, the processor 68 maintains the power ($P_C$) supplied to the compressor 50 at two-thirds (⅔) of maximum power ($P_{MAX, C}$) and the power ($P_{TED, Z1}$) supplied to the first thermoelectric module 58 at maximum power ($P_{MAX, Z1}$), and decreases the power ($P_{TED, Z2}$) supplied to the second thermoelectric module 58. The processor 68 then proceeds to step 224.

In step 224, the processor 68 determines whether a coefficient of performance ($COP_{TED, Z2}$) of the second thermoelectric module 58 is less than a minimum coefficient of performance ($COP_{MIN, Z2}$) of the second thermoelectric module 58. It is understood that the minimum coefficient of performance ($COP_{MIN, Z2}$) of the second thermoelectric module 58 can be pre-set at any suitable level as desired such as at 0.4, for example. If the coefficient of performance ($COP_{TED, Z2}$) of the second thermoelectric module 58 is less than the minimum coefficient of performance ($COP_{MIN, Z2}$), the processor 68 proceeds to step 226. In step 226, the processor 68 maintains the power ($P_C$) supplied to the compressor 50 at the previous level, decreases the power ($P_{TED, Z1}$) supplied to the first thermoelectric module 58, and interrupts the power ($P_{TED, Z2}$) supplied to the second thermoelectric module 58. The processor 68, then in step 228, determines whether the coefficient of performance ($COP_{TED, Z1}$) of the first thermoelectric module 58 is greater than 1. If the coefficient of performance ($COP_{TED, Z1}$) of the first thermoelectric module 58 is not greater than 1, the processor 68 proceeds to step 232. On the other hand, if the coefficient of performance ($COP_{TED, Z1}$) of the first thermoelectric module 58 is not greater than 1, the processor 68, in step 230, decreases the power ($P_C$) supplied to the compressor 50 prior to proceeding to step 232.

In step 232, the processor 68 determines whether the coefficient of performance ($COP_{TED, Z1}$) of the first thermoelectric module 58 is less than a minimum coefficient of performance ($COP_{MIN, Z1}$) of the first thermoelectric module 58. It is understood that the minimum coefficient of performance ($COP_{MIN, Z1}$) of the first thermoelectric module 58 can be pre-set at any suitable level as desired such as at 0.4, for example. If the coefficient of performance ($COP_{TED, Z1}$) of the first thermoelectric module 58 is not less than the minimum coefficient of performance ($COP_{MIN, Z1}$), the processor 68 proceeds to step 240. On the other hand, if the coefficient of performance ($COP_{TED, Z1}$) of the first thermoelectric module 58 is less than the minimum coefficient of performance ($COP_{MIN, Z1}$), the processor 68, in step 234, interrupts both the power ($P_{TED, Z1}$) supplied to the first thermoelectric module 58 and the power ($P_{TED, Z2}$) supplied to the second thermoelectric module 58, and decreases the power ($P_C$) supplied to the compressor 50 prior to proceeding to step 240.

Alternatively, when the coefficient of performance ($COP_{TED, Z2}$) of the second thermoelectric module 58 is not less than the minimum coefficient of performance ($COP_{MIN, Z2}$) of the second thermoelectric module 58 in step 224, the processor 68 proceeds to step 240.

In step 240, the processor 68 determines whether a shutdown of the vehicle 10 has occurred. If the shutdown of the vehicle 10 has occurred, the climate control strategy, in step 242, is stopped. Alternatively, if the shutdown of the vehicle 10 has not occurred, step 206 is repeated.

Figure 7:
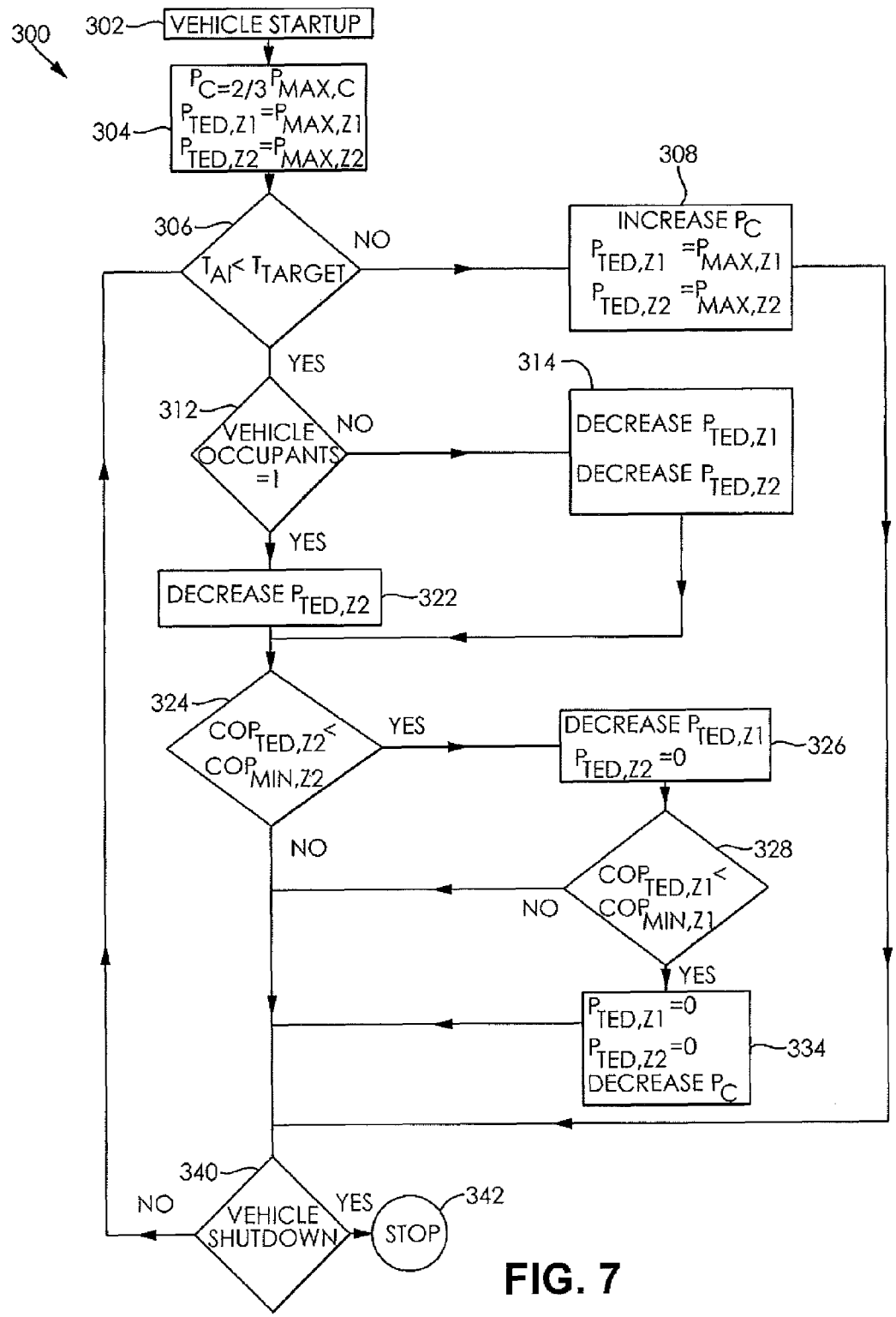
FIG. 7 is a schematic flow diagram of an alternate method of operation of the climate control system illustrated in FIGS. 1-3 during hot ambient temperatures.

As another non-limiting example of the climate control strategy of the present invention, a method 300 is illustrated in FIG. 7. In the illustrated example, the main HVAC system 28 includes a compressor 50 and the auxiliary HVAC system 30 includes a first thermoelectric module 58 for a driver side HVAC zone (TED, Z1) and a second thermoelectric module 58 for a passenger side HVAC zone (TED, Z2). A first step 302 of the method 300 is a startup of the vehicle 10 during which the climate control strategy is enabled. In the example of FIG. 7, the climate control strategy is for operation during relatively hot ambient temperatures (i.e. a cooling mode).

In step 304, a power ($P_C$) supplied to the compressor 50 of the main HVAC system 28, a power ($P_{TED, Z1}$) supplied to the first thermoelectric module 58, and a power ($P_{TED, Z2}$) supplied to the second thermoelectric module 58 are set at predetermined levels by the processor 68. In the illustrated example, the power ($P_C$) supplied to the compressor 50 is set at two-thirds (⅔) of maximum power ($P_{MAX, C}$), the power ($P_{TED, Z1}$) supplied to the first thermoelectric module 58 is set at maximum power ($P_{MAX, Z1}$), and the power ($P_{TED, Z2}$) supplied to the second thermoelectric module 58 is set at maximum power ($P_{MAX, Z2}$). It is understood that the power ($P_C$) supplied to the compressor 50, the power ($P_{TED, Z1}$) supplied to the first thermoelectric module 58, and the power ($P_{TED, Z2}$) supplied to the second thermoelectric module 58 can be set at any predetermined level as desired. It is also understood that the maximum power ($P_{MAX, C}$) supplied to the compressor 50, the maximum power ($P_{MAX, Z1}$) supplied to the first thermoelectric module 58, and the maximum power ($P_{MAX, Z2}$) supplied to the second thermoelectric module 58 can be any suitable amount of power as desired.

In step 306, the processor 68 compares a passenger compartment interior temperature ($T_{AI}$) measured by one of the sensors 72 to a desired level of occupant comfort ($T_{TARGET}$) determined by the processor 68 based upon the predetermined parameters and conditions measured by at least one of the sensors 72. If the passenger compartment interior temperature ($T_{AI}$) is not less than the desired level of occupant comfort ($T_{TARGET}$), the processor 68 proceeds to step 308. In step 308, the processor 68 increases the power ($P_C$) supplied to the compressor 50, and maintains the power ($P_{TED, Z1}$) supplied to the first thermoelectric module 58 and the power ($P_{TED, Z2}$) supplied to the second thermoelectric module 58 at maximum power ($P_{MAX, Z1}$), ($P_{MAX, Z2}$), respectively. The processor 68 then proceeds to step 340.

Alternatively, when the passenger compartment interior temperature ($T_{AI}$) is less than the desired level of occupant comfort ($T_{TARGET}$), the processor 68 proceeds to step 312. In step 312, the processor 68 determines whether the number of vehicle occupants is equal to 1. It is understood that the number of vehicle occupants can be determined based upon the predetermined parameters and conditions measured by at least one of the sensors 72. If the number of occupants is not equal to 1, the processor 68 proceeds to step 314. In step 314, the processor 68 maintains the power ($P_C$) supplied to the compressor 50 at two-thirds (⅔) of maximum power ($P_{MAX, C}$), and decreases both the power ($P_{TED, Z1}$) supplied to the first thermoelectric module 58 and the power ($P_{TED, Z2}$) supplied to the second thermoelectric module 58. The processor 68 then proceeds to step 324.

Alternatively, when the number of vehicle occupants is determined to equal 1 in step 312, the processor 68 proceeds to step 322. In step 322, the processor 68 maintains the power ($P_C$) supplied to the compressor 50 at two-thirds (⅔) of maximum power ($P_{MAX, C}$) and the power ($P_{TED, Z1}$) supplied to the first thermoelectric module 58 at maximum power ($P_{MAX, Z1}$), and decreases the power ($P_{TED, Z2}$) supplied to the second thermoelectric module 58. The processor 68 then proceeds to step 324.

In step 324, the processor 68 determines whether a coefficient of performance ($COP_{TED, Z2}$) of the second thermoelectric module 58 is less than a minimum coefficient of performance ($COP_{MIN, Z2}$) of the second thermoelectric module 58. It is understood that the minimum coefficient of performance ($COP_{MIN, Z2}$) of the second thermoelectric module 58 can be pre-set at any suitable level as desired such as at 0.4, for example. If the coefficient of performance ($COP_{TED, Z2}$) of the second thermoelectric module 58 is less than the minimum coefficient of performance ($COP_{MIN, Z2}$), the processor 68 proceeds to step 326. In step 326, the processor 68 maintains the power ($P_C$) supplied to the compressor 50 at two-thirds (⅔) of maximum power ($P_{MAX, C}$), decreases the power ($P_{TED, Z1}$) supplied to the first thermoelectric module 58, and interrupts the power ($P_{TED, Z2}$) supplied to the second thermoelectric module 58. The processor 68, then in step 328, determines whether a coefficient of performance ($COP_{TED, Z1}$) of the first thermoelectric module 58 is less than a minimum coefficient of performance ($COP_{MIN, Z1}$) of the first thermoelectric module 58. It is understood that the minimum coefficient of performance ($COP_{MIN, Z1}$) of the first thermoelectric module 58 can be pre-set at any suitable level as desired such as at 0.4, for example. If the coefficient of performance ($COP_{TED, Z1}$) of the first thermoelectric module 58 is not less than the minimum coefficient of performance ($COP_{MIN, Z1}$), the processor 68 proceeds to step 340. On the other hand, if the coefficient of performance ($COP_{TED, Z1}$) of the first thermoelectric module 58 is less than the minimum coefficient of performance ($COP_{MIN, Z1}$), the processor 68, in step 334, interrupts both the power ($P_{TED, Z1}$) supplied to the first thermoelectric module 58 and the power ($P_{TED, Z2}$) supplied to the second thermoelectric module 58, and decreases the power ($P_C$) supplied to the compressor 50 prior to proceeding to step 340.

Alternatively, when the coefficient of performance ($COP_{TED, Z2}$) of the second thermoelectric module 58 is not less than the minimum coefficient of performance ($COP_{MIN, Z2}$) of the second thermoelectric module 58 in step 324, the processor 68 proceeds to step 340.

In step 340, the processor 68 determines whether a shutdown of the vehicle 10 has occurred. If the shutdown of the vehicle 10 has occurred, the climate control strategy, in step 342, is stopped. Alternatively, if the shutdown of the vehicle 10 has not occurred, step 306 is repeated.

Although the methods 200, 300 described hereinabove compare a passenger compartment interior temperature ($T_{AI}$) to a desired level of occupant comfort ($T_{TARGET}$) to control the power supplied to the compressor 50 of the main HVAC system 28 and the thermoelectric modules 58 of the auxiliary HVAC system 30, it is understood that a comparison of a temperature of each HVAC zone within the vehicle to a desired level of comfort of an occupant seated within the respective HVAC zone can be used if desired. It is further understood that other suitable methods can be used in carrying out the climate control strategy of the present invention such as a method for operation in cold ambient temperatures, a method which control of fewer of additional components and systems of the vehicle are required (e.g. fewer or additional thermoelectric modules 58, a seat system), and the like, for example.

Advantageously, the vehicle 10 includes the climate control system having the main HVAC system 28 and the auxiliary HVAC system 30 of the present disclosure. The use of the auxiliary HVAC system 30 minimizes a capacity requirement of the main HVAC system 28, and thereby also minimizes a package size of the main HVAC system 28 by allowing smaller heating and cooling elements 38, 40, respectively, a smaller compressor 50, a smaller condenser 52, and a smaller blower 54 to be used. In addition, the climate control system beneficially permits the HVAC controller 68 to directly monitor and measure parameters and conditions of various components and systems of the vehicle 10 which effect electrical energy consumption and occupant comfort. The ability to control the main HVAC system 28 and the auxiliary HVAC system 30 based upon the measured parameters and conditions allows the climate control system to optimize overall electrical energy consumption, overall vehicle fuel economy, and overall occupant comfort.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A climate control system for a vehicle, comprising:
   a main heating, ventilating, and air conditioning system for conditioning a first fluid discharged into a passenger compartment of the vehicle, the passenger compartment having at least one heating, ventilating, and air conditioning zone;
   an auxiliary heating, ventilating, and air conditioning system for conditioning a localized fluid of the at least one heating, ventilating, and air conditioning zone of the passenger compartment;
   a controller for controlling the main heating, ventilating, and air conditioning system and the auxiliary heating, ventilating, and air conditioning system based upon at least one of at least one parameter and at least one condition which pertains to at least one of electrical energy consumption of the vehicle and occupant comfort; and
   at least one sensor for detecting and measuring at least one of the at least one parameter and the at least one condition which pertains to the at least one of electrical energy consumption of the vehicle and the occupant comfort.

2. The system according to claim 1, wherein the main heating, ventilating, and air conditioning system includes a conditioning module having a cooling element and a heating element disposed therein for varying a temperature of the first fluid.

3. The system according to claim 1, wherein the auxiliary heating, ventilating, and air conditioning system includes at least one thermoelectric module having a thermoelectric device and a heat exchanger disposed therein for varying a temperature of the localized fluid of the at least one heating, ventilating, and air conditioning zone.

4. The system according to claim 1, further comprising a seat system for conditioning a localized fluid of a seat disposed in the passenger compartment.

5. The system according to claim 4, wherein the seat system includes a thermoelectric device and a heat exchanger disposed therein for varying a temperature of the localized fluid of the seat.

6. The system according to claim 4, wherein the controller controls the seat system based upon at least one of the at least one parameter and the at least one condition which pertains to the at least one of electrical energy consumption of the vehicle and the occupant comfort.

7. A method of operating a vehicle climate control system, the method comprising the steps of:
providing a main heating, ventilating, and air conditioning system for conditioning a first fluid discharged into a passenger compartment of the vehicle, the passenger compartment having at least one heating, ventilating, and air conditioning zone;
providing an auxiliary heating, ventilating, and air conditioning system for conditioning a localized fluid of the at least one heating, ventilating, and air conditioning zone of the passenger compartment;
providing a controller for controlling the main heating, ventilating, and air conditioning system and the auxiliary heating, ventilating, and air conditioning system;
measuring at least one of at least one parameter and at least one condition which pertains to at least one of electrical energy consumption of the vehicle and occupant comfort;
determining an actual level of occupant comfort based upon at least one of the at least one measured parameter and the at least one measured condition; and
controlling the main heating, ventilating, and air conditioning system and the auxiliary heating, ventilating, and air conditioning system based upon the actual level of occupant comfort while minimizing electrical energy consumption.

8. The method according to claim 7, wherein the main heating, ventilating, and air conditioning system includes a conditioning module having a cooling element and a heating element disposed therein for varying a temperature of the first fluid.

9. The method according to claim 7, wherein the auxiliary heating, ventilating, and air conditioning system includes at least one thermoelectric module having a thermoelectric device and a heat exchanger disposed therein for varying a temperature of the localized fluid of the at least one heating, ventilating, and air conditioning zone.

10. The method according to claim 7, further comprising the step of providing a seat system for conditioning a localized fluid of a seat disposed in the passenger compartment.

11. The method according to claim 10, wherein the seat system includes a thermoelectric device and a heat exchanger disposed therein for varying a temperature of the localized fluid of the seat.

12. The method according to claim 10, further comprising the step of controlling the seat system based upon at least one of the at least one measured parameter and the at least one measured condition which pertains to the at least one of electrical energy consumption of the vehicle and the occupant comfort.

13. The method according to claim 10, further comprising the step of determining an amount of work required by at least one of the main heating, ventilating, and air conditioning system, the auxiliary heating, ventilating, and air conditioning system, and the seat system to reach a desired level of occupant comfort from the actual level of occupant comfort.

14. The method according to claim 13, further comprising the step of determining a flow rate and a fluid discharge temperature for at least one of the main heating, ventilating, and air conditioning system, the auxiliary heating, ventilating, and air conditioning system, and the seat system based upon the amount of work required while minimizing the electrical energy consumption of the vehicle.

15. A method of operating a vehicle climate control system, the method comprising the steps of:
providing a main heating, ventilating, and air conditioning system for conditioning a first fluid discharged into a passenger compartment of the vehicle, the passenger compartment having at least one heating, ventilating, and air conditioning zone;
providing an auxiliary heating, ventilating, and air conditioning system for conditioning a localized fluid of the at least one heating, ventilating, and air conditioning zone of the passenger compartment;
providing at least one seat system for conditioning a localized fluid of at least one seat disposed in the passenger compartment;
providing a controller for controlling at least one of the main heating, ventilating, and air conditioning system, the auxiliary heating, ventilating, and air conditioning system, and the seat system;
measuring at least one of at least one parameter and at least one condition which pertains to at least one of electrical energy consumption of the vehicle and occupant comfort;
determining an actual level of occupant comfort based upon at least one of the at least one measured parameter and the at least one measured condition;
determining an amount of work required by at least one of the main heating, ventilating, and air conditioning system, the auxiliary heating, ventilating, and air conditioning system, and the seat system to reach a desired level of occupant comfort from the actual level of occupant comfort;
calculating a flow rate and a fluid discharge temperature for at least one of the main heating, ventilating, and air conditioning system, the auxiliary heating, ventilating, and air conditioning system, and the seat system based upon the amount of work required while minimizing the electrical energy consumption of the vehicle; and
controlling the main heating, ventilating, and air conditioning system and the auxiliary heating, ventilating, and air conditioning system based upon the calculated flow rate and the calculated fluid discharge temperature for at least one of the main heating, ventilating, and air conditioning system, the auxiliary heating, ventilating, and air conditioning system, and the seat system.

16. The method according to claim 15, wherein the main heating, ventilating, and air conditioning system includes a conditioning module having a cooling element and a heating element disposed therein for varying a temperature of the first fluid.

17. The method according to claim 15, wherein the auxiliary heating, ventilating, and air conditioning system includes at least one thermoelectric module having a thermoelectric device and a heat exchanger disposed therein for varying a temperature of the localized fluid of the at least one heating, ventilating, and air conditioning zone.

18. The method according to claim 15, wherein the seat system includes a thermoelectric device and a heat exchanger disposed therein for varying a temperature of the localized fluid of the seat.

19. The method according to claim 15, further comprising the step of determining the desired level of occupant comfort based upon at least one of the at least one measured parameter and the at least one measured condition.

* * * * *